United States Patent Office 2,720,727
Patented Oct. 18, 1955

2,720,727
CONTROL OF PLANT DISEASES

Charles Pidacks, Montvale, N. J., assignor to American Cyanamid Company, New York, N. Y., a corporation of Maine No Drawing. Application May 15, 1952,
Serial No. 288,040

5 Claims. (Cl. 47—58)

My invention relates to the prevention and control of plant infections caused by microorganisms by treatment of the plants with chlortetracycline. Chlortetracycline is an antibiotic described in Patent No. 2,482,055 to B. M. Duggar, dated September 13, 1949, entitled Aureomycin and Preparation of the Same. Chlortetracycline is the generic name for the material referred to in the Duggar patent as Aureomycin.

Plants as well as animals are subject to attack by microorganisms. The types of microorganisms which attack plants are generally somewhat different from those which attack animals.

Methods for the protection of plants from attack by microorganisms are in general not too satisfactory. In the past, some plant diseases have been controlled by the use of toxic sprays such as mercuric chloride or potassium permanganate. These sprays usually leave toxic residues which may render the method dangerous if used on plants which provide foodstuffs or which may be contacted by humans, such as flowers or ornamental plants, or plants used around dwellings. Also, such toxic materials are hazardous to farm animals, birds, pets and insects.

Another method of control has been the eradication of the host by fire, burying, or a strong caustic chemical, or other destructive agent. Such agents are expensive and destroy the plant. Areas which are once infected may remain unusable for the cultivation of susceptible plants for extended periods. The losses caused by such infections are economically disastrous in many areas.

I have found that by treating infected plants with chlortetracycline it is possible to control the growth of many pathogenic organisms without destruction of the host. Among the plant pathogens which may be controlled by treatment with chlortetracycline are:

Agrobacterium tumefaciens which causes plant galls;

Agrobacterium rhizogenes which affects the apple family;

Bacterium stewartii which causes losses in corn and related plants;

Erwinia amylovora which attacks a large number of species of the family Rosaceae;

Erwinia aroideae which is responsible for soft rot of calla, potatoes, cauliflower, radishes, cucumbers, cabbage, parsnips, turnips and tomatoes;

Erwinia carotovora which causes economic losses in carrots, cabbage, celery, cucumbers, egg plant, muskmelon, onions, parsnips, peppers, potatoes, radishes, tomatoes, turnips, as well as such flowers as hyacinths, iris, etc.;

Erwinia cytolytica which causes soft rot in tubers and stems of dahlias;

Erwinia tracheiphila which causes wilt of cucumbers, muskmelons, canteloupe, pumpkins and squashes;

Other pathogens of the Erwinia family;

Corynebacterium insidiosum, a vascular pathogen of alfalfa;

Pseudomonas gladioli which is responsible for the crown rot of gladiolas and other tubers;

Pseudomonas solanacearum which causes a potato rot;

Xanthomonas campestris which affects cabbage, cauliflower and other related plants;

Xanthomonas phaseoli which affects beans including hyacinth beans, lupine beans, soybeans, etc.;

Xanthomonas pruni, a pathogen of plums, peaches, apricots, etc.

Other similar pathogens and the plants which they affect will suggest themselves to experts in the field.

Plants, seeds or seedlings, bulbs, tubers, rhizomes, during either a dormant stage or growth stage, may be treated with neutral chlortetracycline or a therapeutically effective salt thereof to control the attacking organism. The susceptibility of the various pathogens to chlortetracycline is quite variable and varies from species to species and in the various strains within a species. An aqueous solution containing from 1 to 1000 milligrams of chlortetracycline, calculated as the hydrochloride, per liter usually gives effective control. I prefer a concentration of 5 to 100 milligrams per liter. The more dilute solutions are particularly effective on the loose textured, softer plants, and higher concentrations and longer times of contact are preferred for the harder, more fibrous plants, and more resistant organisms.

A dip or spray usually leaves sufficient adherent chlortetracycline containing liquid on the plant so that a prolonged immersion is not necessary. A dip of from 1 to 24 hours is convenient for dormant stages, or for rhizomes, bulbs or tubers in growth stages. Wetting agents may be used to improve the penetration and contact of the treating solution.

Seeds, bulbs, tubers, rhizomes, etc. during a dormant stage may be treated with chlortetracycline for pathogen control or as a prophylactic measure to reduce the incidence of plant diseases. Such prophylactic measures are particularly important with the more valuable species and are especially useful if the plants are to be taken from place to place and exposed to varying degrees of danger of infection, as for example, exhibits and show flowers, and plants which are exhibited at fairs, flower shows and other places. The seeds, bulbs, rhizomes, etc. may be dusted with a chlortetracycline powder. For economic reasons it is advantageous to dilute the chlortetracycline with a cheaper diluent so that it may be more uniformly distributed at a low treatment expense.

I have found that not only may an application of chlortetracycline prevent the disease but may actually be used to salvage infected plants. For instance, by immersing iris rhizomes in aqueous chlortetracycline solutions, infections which are actually in the process of destroying the rhizomes will be controlled and the rhizomes will continue to grow. With other types of plants the seeds or seedlings may be treated by immersion or spraying with a solution of chlortetracycline, or a powder containing chlortetracycline.

Any of the standard forms of chlortetracycline may be used, such as chlortetracycline hydrochloride, chlortetracycline sulfate, neutral chlortetracycline, calcium chlortetracycline, sodium chlortetracycline, or others of the salts, complexes or addition products of chlortetracycline.

EXAMPLE 1

An iris garden containing approximately 200 tall bearded iris was infected in varying degrees with bacterial soft rot subsequently identified as Erwinia carotovora. Each plant was dug from the bed and the fans were cut back to approximately 6 inches. All visibly infected areas were cut away and the rhizomes were separated. The cut rhizomes were then submerged in an aqueous solution containing 1 level teaspoonful of chlortetracycline hydrochloride for each 10 gallons of water (approximately 100 mg. per liter). The plants were submerged in the chlortetracycline solution for periods from 2½ to 24 hours, depending upon working convenience, and permitted to dry. The dried plants were dusted with a mixture containing chlortetracycline hydrochloride and replanted in a new section of the garden. The plants which had been submerged for the shorter periods recovered and resumed growth normally. Those which had been submerged for between 16 and 24 hours lost their fans within a few days and recovered more slowly. Ultimately every plant recovered and sent out new growth from the rhizomes. After a period of 5 months, only 12 of 200 treated plants had been lost to the rot. There was no apparent correlation between plant death and the duration of the submergence treatment. In an untreated control plot entire sections with hundreds of plants were completely destroyed by the rot.

EXAMPLE 2

The plants were treated as above but before replanting were treated with a mixture comprising and consisting of 100 parts of sulfur, 10 parts of lead arsenate, 1 part of chlortetracycline hydrochloride, 1 part of mercuric chloride and 1 part of sulfanilamide. The dusting treatment appeared to give a greater resistance to reinfection than that possessed by undusted plants.

EXAMPLE 3

A pure culture of *Erwinia carotovora* was isolated from the infected iris rhizomes. Healthy rhizomes were submerged for 6 hours in a solution containing 1 gram of chlortetracycline hydrochloride per liter of water. The rhizomes were removed and permitted to dry, and inoculated with *Erwinia carotovora*. The rhizomes remained healthy in every respect.

A second group of rhizomes were submerged in water for 6 hours and were then inoculated with identical cultures of *Erwinia carotovora*. Within 24 hours the rhizomes which had been submerged in water alone were completely destroyed.

As my invention, I claim:

1. The method of treating rhizomes comprising immersing the rhizomes in an aqueous solution of chlortetracycline.

2. The method of controlling bacterial infection in rhizomes which comprises immersing the rhizomes during a growth stage in an aqueous solution containing from about 10 to 100 milligrams per liter of a therapeutically effective form of chlortetracycline for from 2½ to 24 hours, removing the rhizomes from the solution, and replanting the thus treated rhizomes.

3. The method of claim 2 in which chlortetracycline hydrochloride is used as the therapeutically effective form of chlortetracycline.

4. The method of controlling *Erwinia carotovora* infection in rhizomes which comprises immersing rhizomes, subject to attack by *Erwinia carotovora*, in an aqueous solution containing from about 10 to 100 milligrams per liter of chlortetracycline hydrochloride for from 2½ to 24 hours, removing the rhizomes from the solution, and planting the thus treated rhizomes.

5. The method of controlling *Erwinia carotovora* infection in rhizomes which comprises immersing rhizomes, subject to attack by *Erwinia carotovora*, in an aqueous solution containing from about 10 to 100 milligrams per liter of chlortetracycline hydrochloride for from 2½ to 24 hours, removing the rhizomes from the solution, drying the rhizomes, dusting the rhizomes with a mixture consisting essentially of 100 parts of sulfur, 10 parts lead arsenate, 1 part of chlortetracycline hydrochloride, 1 part of mercuric chloride and 1 part sulfanilamide and planting the thus treated rhizomes.

References Cited in the file of this patent

UNITED STATES PATENTS 2,482,055    Duggar ---------------- Sept. 13, 1949

OTHER REFERENCES

"The New Garden Encyclopedia" (Seymour). Published by Wm. H. Wise & Co. (N. Y.) 1941, pp. 692, 693.

Weindling et al.: Ann. Rev. Microbiol., vol. 4, pp. 247–260 (1950).

Brian et al.: Nature (London), vol. 167, No. 4244, pp. 347–349 (March 3, 1951).

J. Am. Med. Assoc., July 7, 1951, pp. 929–930.

Beale & Jones: Contrib. Boyce Thompson Inst., vol. 16, No. 8, pp. 395–407 (December 1951).

Chemical Abstracts, vol. 45, col. 6702F (August 10, 1951), "Uptake of Aureomycin . . ."

Chemical Abstracts, vol. 46, col. 570C (January 25, 1952), "Inhibition of Plant Pathogenic . . ."

Chemical Abstracts, vol. 46, col. 1691h (February 25, 1952), "Aureomycin Chemotherapy . . ."

Chemical Abstracts, vol. 46, cols. 1693, 1694 (February 25, 1952), "Cytological Effects . . ."